Figure 1:
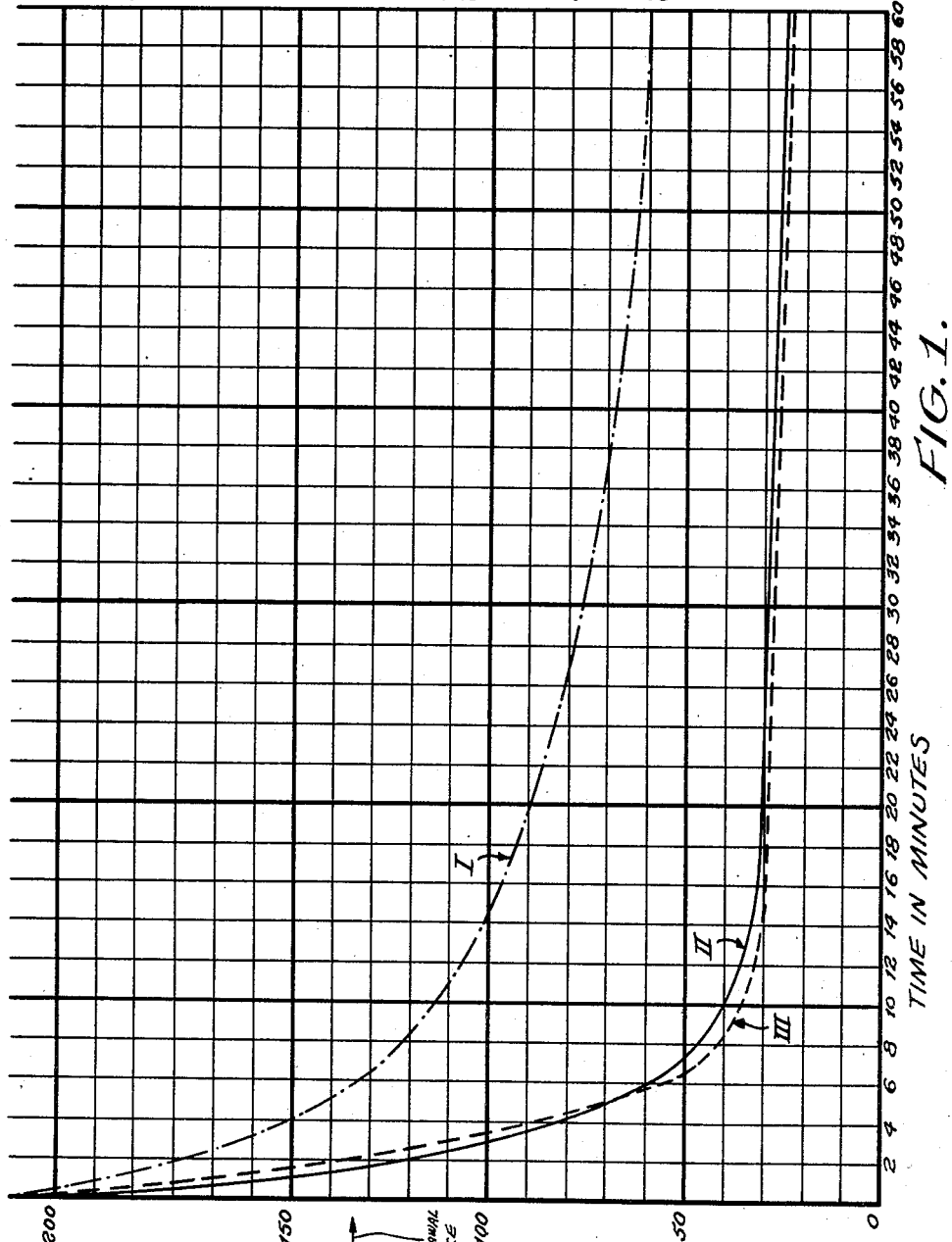
Figure 2:
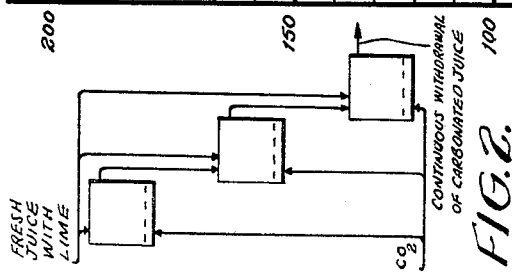

June 19, 1951 J. C. SEAILLES 2,557,800
SUGAR JUICE CARBONATION
Filed July 30, 1947

INVENTOR.
Jean Charles Seailles
BY
Michael S. Striker

Patented June 19, 1951

2,557,800

UNITED STATES PATENT OFFICE 2,557,800

SUGAR JUICE CARBONATION

Jean Charles Seailles, Paris, France

Application July 30, 1947, Serial No. 764,882
In France January 25, 1944

Section 1, Public Law 690, August 8, 1946
Patent expires January 25, 1964

7 Claims. (Cl. 127—52)

It is a well known fact that the carbonatation of sugar factory juices after the liming operation yields very fine calcium carbonate precipitates which, owing to this fineness, cannot be readily decanted while their filtration is a relatively delicate matter. It is also known that the precipitation of calcium carbonate can be improved by effecting the same in the presence of a primer. The old method which consists in mixing the scums from the second carbonatation with the initial juice did involve a priming. According to the Psinicka method, the admixture of 25 to 30% of an already carbonated juice to the raw diffusion juice also involves a priming. The Dorr process which utilizes 600% of carbonated juice is based on the same principle.

Research work conducted by the inventor led him, however, to the surprising finding that it is possible even in the absence of any primer to directly obtain a much more granular and denser initial precipitate than the one which is usually formed and that this result can be obtained by progressively subjecting the raw juice to the action of carbon dioxide gas in the presence of mother waters resulting from the treatment and by maintaining it mixed with them by a suitable agitation.

It is therefore an object of the present invention to provide a new or improved method obviating the above-stated disadvantages by carrying out the carbonatation process under such conditions that the ensuing carbonate precipitates are considerably coarser than those obtained by the customary methods.

Another object of the invention is to provide a method as aforesaid wherein a primary precipitate obtained as will be set forth as a primer for one or more further successive carbonatation operations gives rise to a final precipitate which is denser, more granular and easier to decant and to filter.

A further object of the invention is to provide a method as aforesaid capable of being carried out either continuously or discontinuously and giving, when priming is resorted to, the possibility of using as a primer not only the precipitate from a previous treatment but also a separately prepared primer or else a primer from a different operation such as the second carbonatation.

With these and such other objects in view as will incidentally appear hereafter, the invention comprises the novel steps and sequence of steps that will come out of the continuation of this specification and will be more specifically pointed out in the appended claims.

The method according to the invention permits a dense precipitate of calcium carbonate which is easy to decant, to filter and to wash being obtained, and its essential characteristic resides in the fact that the juice to be treated is subjected in a progressive manner to the action of carbon dioxide in the presence of mother waters and calcium carbonate resulting from the treatment with suitable agitation of the constituents of the mixture to attain the result aimed at.

By way of illustrative explanation, three comparative experiments of characteristic nature will now be set forth, these experiments bearing on the same limed sugar factory juice. This explanation is given with reference to the curves in Figure 1 of the accompanying drawing which show how the decantation of resultant precipitates takes place in each case. Such curves indicate in terms of time, reckoned in minutes, the apparent volume of the precipitate, the volumes being expressed in arbitrary units.

*First experiment.*—A given quantity of juice was placed into a carbonator of known construction and subjected to slow carbonatation. When examined under the microscope, the precipitate grain was found to be very fine. Curve I shows the conditions of decantation.

*Second experiment.*—This experiment was effected on the same quantity of juice as in the preceding experiment. Carbon dioxide was let into the apparatus at the same speed, but the juice to be carbonated was progressively introduced into the carbonator in small batches, each further batch being admixed with the whole of previously carbonated batches, the already formed precipitate remaining in the liquid contained in the carbonator while carbon dioxide gas is admitted in a continuous way during the whole duration of the operation. The progress of the decantation is represented by curve II.

*Third experiment.*—After carrying out an experiment according to the process used for the second experiment, the liquid was drawn off, and the resulting precipitate was left in the carbonator, whereupon a further quantity of raw juice was treated under the same conditions in the presence of the precipitate derived from the previous operation and suitably agitated. This precipitate can be used as a primer. Curve III is illustrative of the corresponding decantation.

As the plotting of the curves is obtained from equal quantities of liquid of the same quality, curves I and II disclose equal quantities of precipitate in the liquid, while curve III discloses twice as much precipitate as in curves I and II.

After ten minutes of decantation in the first experiment, the apparent precipitate volume is equal to 113. After one hour of treatment, it amounts up to 60 and falls to only 42 after 16 hours. In the second experiment, after 10 minutes, the apparent volume of precipitate has already fallen to 40 and after one hour to 24. In other words, after 10 minutes, a precipitate is separated in this second experiment which, for an equal weight, is less bulky than the one which derives from the first experiment after 16 hours of rest. After one hour of decantation, the volumes of an equal weight of precipitate formed in the two experiments are in the ratio of 60 to 24.

However, the curve III shows that in the third experiment the result is still better because the volume of precipitate under consideration contains twice more material than for curves I and II for a volume which remains of the same order. In other words, if the result of this experiment is compared with the result of experiment No. 1, the volumes of precipitate having equal weight are in the ratio of 60 to 12 after one hour of decantation.

The operational method proposed by the invention clearly comes out of these findings and experiments. It may be stated to consist in progressively bringing the liquid to be carbonated into contact with carbon dioxide either in successive discontinuous batches or at a continuous rate of delivery and with a suitably selected speed, the mixing being effected in the presence of mother waters from the operation, said waters being conveniently agitated to provide proper intermingling.

A technical interest will be found in combining this process with the introduction of germs of precipitation which will be preferably taken from precipitates resulting from previous operations. It may be particularly advantageous to proceed by way of successive precipitations in each of which the primer used is constituted by the preceding precipitate. Thus for example a primary volume of juice may be carbonated and may yield a precipitate I which, after being separated from mother waters, may serve as a primer for the treatment of a further volume of juice which, once carbonated in turn, gives a precipitate having a weight equal to twice the precipitate I but a reduced volume and so forth.

The carrying of the method into industrial practice may be effected by any appropriate means. In the continuation of this specification, a discontinuous process and a continuous process will be described by way of examples.

In the discontinuous process, a carbonatation tank is used and is progressively filled with juice to be carbonated while at the same time the carbonatation itself is effected so that, when the tank is full, the carbonatation is almost completed. The adjustment of the carbonatation is then completed and, after decantation, the clarified juice is separated. The operation is then repeated by putting the precipitate into suspension again and by operating as above described. Were the injection of carbon dioxide insufficient for keeping the precipitate in a state of suspension, it is obvious that an efficient agitator ought to be provided. Where the precipitate is sufficiently granular, it is drained off and sent to the filtration and washing stages.

In the continuous process, the carbonator may be divided for example into a suitable number of intercommunicating compartments which by sequential overflow pour off their contents into one another, each of said compartments being fed in parallel in fresh juice and also in carbon dioxide. The carbonated juice regularly flows out of the last or tail compartment and the precipitate is separated therefrom by suitable means, for example by decantation. A suitable fraction of the precipitate thus collected may be forced back to the leading or head compartment to serve as a primer. By suitably adjusting the number of compartments, the speed of carbonatation and, if required, the proportion of primer, the quality of the precipitate which ultimately reaches the filtration and washing stages may be regulated at will. This continuous process is clearly illustrated by Fig. II which is a diagrammatic flow sheet of the invention. It is evident therefrom that the limed juice and the $CO_2$ are fed simultaneously into a plurality of chambers, which communicate with each other by sequential overflow. Consequently, the limed juice and the $CO_2$ are fractioned in a plurality of stages and the carbonation is carried from the first tank to the last tank with increasing and progressing dilution. Thus, the fresh limed juice and the fresh $CO_2$ in each succeeding stage react in the presence of the reaction products comprising both the precipitated calcium carbonate and the simultaneously treated sugar juice obtained from the preceding stages. The calcium carbonate precipitate formed in each chamber is kept in a state of suspension and overflows together with the carbonated juice into the succeeding chambers until a sufficiently granular precipitate is obtained as a result. At this point, the precipitate may be decanted or otherwise separated from the juice and sent to the filtration and washing stages.

Where priming is resorted to, the possibility is afforded of using as a primer not only the precipitate from a previous operation but also a separately prepared primer or else a primer from a different operation such as the second carbonatation.

What is claimed is:

1. A method of carbonating juices in the manufacture of sugar comprising in combination the step of subjecting a volume of limed raw juice to the action of carbon dioxide; and then treating in successive steps additional volumes of raw juice with corresponding additional amounts of carbon dioxide in the presence of reaction products comprising both the precipitated calcium carbonate and the simultaneously treated sugar juice obtained in the previous steps.

2. A method of carbonating juices in the manufacture of sugar comprising the step of subjecting a volume of limed raw juice to the action of carbon dioxide; then adding in successive steps additional volumes of raw juice and corresponding additional amounts of carbon dioxide in the presence of reaction products comprising both the precipitating calcium carbonate and the simultaneously treated sugar juice obtained in the previous steps; and finally separating the carbonated juice.

3. A method of carbonating juices in the manufacture of sugar comprising the step of subjecting a volume of limed raw juice to the action of carbon dioxide; then adding in successive steps additional volumes of raw juice and corresponding additional amounts of carbon dioxide in the presence of reaction products comprising both the precipitating calcium carbonate and the simultaneously treated sugar juice obtained in the previous steps; finally separating the carbonated juice; and reusing the precipitate obtained thereby as a primer in a like succession of steps.

4. A method of carbonating juices in the manufacture of sugar comprising in combination the first step of subjecting a volume of limed raw juice to the action of carbon dioxide in the presence of a precipitate obtained in the carbonation of like juice; and then treating in successive steps additional volumes of raw juice with corresponding additional amounts of carbon dioxide in the presence of reaction products comprising both the precipitated calcium carbonate and the simultaneously treated sugar juice obtained in the previous steps.

5. A method of carbonating juices in the manufacture of sugar comprising in combination the steps of introducing a volume of limed raw juice into a first compartment of a sectional carbonating tank; subjecting the juice therein to the action of carbon dioxide; then passing the liquid by overflow through successive further compartments while adding additional amounts of raw juice and corresponding additional amounts of carbon dioxide in each compartment; and finally recovering the carbonated juice from the last compartment.

6. A method of carbonating juices in the manufacture of sugar comprising in combination the steps of introducing a volume of limed raw juice into a first compartment of a sectional carbonating tank; subjecting the juice therein to the action of carbon dioxide in the presence of a precipitate obtained in the carbonation of like juice; then passing the liquid by overflow through successive further compartments while adding additional amounts of raw juice and corresponding additional amounts of carbon dioxide in each compartment; and finally recovering the carbonated juice from the last compartment.

7. A continuous process of carbonating juices in the manufacture of sugar comprising in combination the steps of introducing a volume of limed raw juice into a first compartment of a sectional carbonating tank; subjecting the juice therein to the action of carbon dioxide in the presence of a precipitate obtained by the carbonation of like juice; then passing the liquid by overflow through successive further compartments while adding additional amounts of raw juice and corresponding additional amounts of carbon dioxide in each compartment; finally recovering the carbonated juice from the last compartment; and feeding back the precipitate obtained thereby into the first compartment for use as a primer.

JEAN CHARLES SEAILLES.

REFERENCES CITED

The following references are of record in the file of this patent:

UNITED STATES PATENTS

| Number | Name | Date |
|---|---|---|
| 1,755,165 | Bull | Apr. 22, 1930 |
| 1,868,472 | Ramsey | July 19, 1932 |
| 2,143,594 | Cowan | Jan. 10, 1939 |
| 2,164,186 | Brown | June 27, 1939 |
| 2,288,479 | Nees | June 30, 1942 |
| 2,377,634 | Kidd | June 5, 1945 |